United States Patent
Morando

(10) Patent No.: US 7,234,869 B1
(45) Date of Patent: Jun. 26, 2007

(54) SINK ROLL BEARING HAVING CERAMIC ELEMENTS FOR SUPPORTING THE ROLL'S SHAFT

(75) Inventor: Jorge A. Morando, Girona (ES)

(73) Assignee: Alphatech, Inc., Taylor, MI (US)

( * ) Notice: Subject to any disclaimer, the term of this patent is extended or adjusted under 35 U.S.C. 154(b) by 31 days.

(21) Appl. No.: 11/345,774

(22) Filed: Feb. 2, 2006

(51) Int. Cl.
*F16C 17/02* (2006.01)

(52) U.S. Cl. ............... 384/282; 384/283; 384/297; 384/302

(58) Field of Classification Search ......... 384/297, 384/302, 276, 284, 282–283
See application file for complete search history.

(56) References Cited

U.S. PATENT DOCUMENTS

| | | | | | |
|---|---|---|---|---|---|
| 5,067,826 | A | * | 11/1991 | Lemelson | 384/492 |
| 5,356,227 | A | * | 10/1994 | Sibley et al. | 384/463 |
| 5,433,531 | A | * | 7/1995 | Thompson | 384/276 |
| 5,482,385 | A | * | 1/1996 | Yokota et al. | 384/572 |
| 6,692,689 | B2 | | 2/2004 | Morando | |

* cited by examiner

*Primary Examiner*—Lenard A. Footland
(74) *Attorney, Agent, or Firm*—Charles W. Chandler

(57) ABSTRACT

A bearing for supporting a shaft submerged in molten zinc, has a bearing surface comprising a steel cylindrical liner having slots retaining ceramic shaft-engaging bearing elements.

19 Claims, 4 Drawing Sheets

SINK ROLL BEARING HAVING CERAMIC ELEMENTS FOR SUPPORTING THE ROLL'S SHAFT

BACKGROUND AND SUMMARY OF THE INVENTION

Sink roll assembly bearings used for providing tension on a metal strip, being advanced in a bath of molten metal, have a very short life. The short life exists because of distortion and misalignment created between the bearing components, operating in high metal temperatures. In addition, chemical reactions occur between the molten metal and the bearings. Heavy surface unit loading combined with the low operating rotational speed experienced by the rolls, also shortens bearing life.

I have solved some of the problems related to these environmental conditions. An example, may be found in my U.S. Pat. No. 6,692,689 issued Feb. 17, 2004 for "Sink Roll Assembly with Forced Hydrodynamic Film Lubricated Bearings and Self-Aligning Holding Arms". This invention substantially extended the life of the rolls by aligning the roll shaft with the bearing axis, and pumping molten metal under pressure to the bearing surfaces in the form of a hydrodynamic lubricating film, created by the reduction of the surface unit load acting on the bearing.

The invention disclosed in this application provides a longer operating life by providing ceramic elements in the bearing liner that supports the shaft. Ceramic has a greatly reduced wear pattern compared to the steel alloys normally used for sink rolls, because of its hardness, low coefficient of friction and resistance to chemical attack by the molten metal.

One approach for using ceramic bearing materials has been to use a ceramic liner in a steel alloy sleeve for supporting the shaft. This approach has worked in the laboratory, but is not suitable for an industrial application for several reasons. One reason is that the steel holding ring that carries the ceramic has a much larger coefficient of expansion than the ceramic. The result is that when the ceramic liner is heated to the operating temperature (900° F. to 1300° F. in most cases), the interface between the ceramic liner and the holding sleeve develops a substantial clearance which then causes the unsupported ceramic to shatter. An unsupported ceramic liner will shatter in an industrial application, because of the severe pounding it experiences, caused by the moving metal strip submerged in the molten metal bath.

I have found that employing a steel liner for supporting several ceramic elements in slots in a holding sleeve, prevents the ceramic elements from being separated from the liner and compensates for the differences in the coefficients of expansion of the steel and the ceramic, minimizing the high temperature running clearance.

In the preferred embodiment, the liner has an internal cylindrical surface, having elongated slots in a pattern that extends around the cylindrical surface. An elongated strip of ceramic material is inserted into each of the slots. The collective inner surface of the ceramic elements combines with the liner surface to form a shaft-supporting structure. This arrangement provides the advantage of using the long operating life of a ceramic component without the differential expansion problems.

The process for making such a bearing comprises forming a steel alloy liner having slots for receiving the ceramic elements. The slots, at room temperature, are slightly smaller than the ceramic elements. The liner is then heated to a suitable temperature, such as 1000° F. to expand the slots. The ceramic elements are inserted in the slots. The steel liner is then cooled so that the ceramic elements are tightly held in the slots (i.e. 0.0002±0.0001 inches interference fit). The outside and inside diameters of the steel liner-ceramic inserts assembly are then ground to appropriate dimensions, the outside diameter to receive the holding sleeve, the inside diameter to receive the sink roll shaft trunion.

To prevent the ceramic elements from moving radially outwardly from the liner when operating at high temperature, a holding sleeve is heated to expand it. The heated holding sleeve telescopically receives the liner and the ceramic elements to form a tight fitting connection between the holding sleeve and the steel liner. The holding sleeve and the liner are made of the same materials so that they have the same coefficient of expansion. Thus, as the bearing is heated to an operating temperature, the liner and the holding sleeve expand as a unit while retaining the ceramic elements in their respective slots.

The radial forces applied to the bearing by the shaft are directed toward a particular area of the bearing surface. Over a period of time the shaft will gradually wear the liner in the localized operating area of the bearing surface. The bearing can then be rotated (about 90°) to permit an unworn area of the bearing surface to support the shaft. This can be repeated several times by progressively rotating the bearing whenever required, thus improving by a factor of four the already extended life of the bearing, resulting in additional savings in bearing materials as well as the time in replacing a worn bearing.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
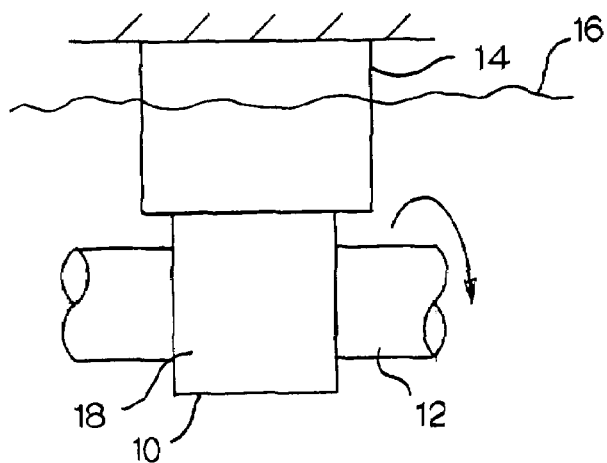
FIG. 1 is a view illustrating the environment in which the inventive bearing is mounted.
Figure 4:
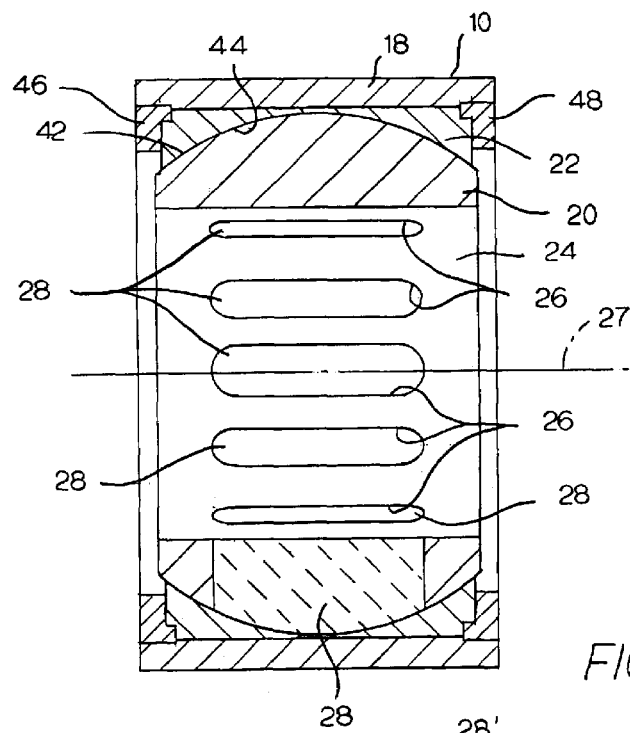
FIG. 4 is a sectional view as seen along lines 4-4 of FIG. 9.

Referring to FIGS. 1 and 4, bearing 10 illustrates a preferred embodiment of the invention for supporting a rotatable shaft 12. Structure 14 supports the bearing and the shaft below level 16 of a bath of molten metal. A bearing housing 18 supports a liner 20, and a holding sleeve 22.

The sleeve and the liner are cylindrical with the liner having a cylindrical inner liner surface 24.

Figure 2:
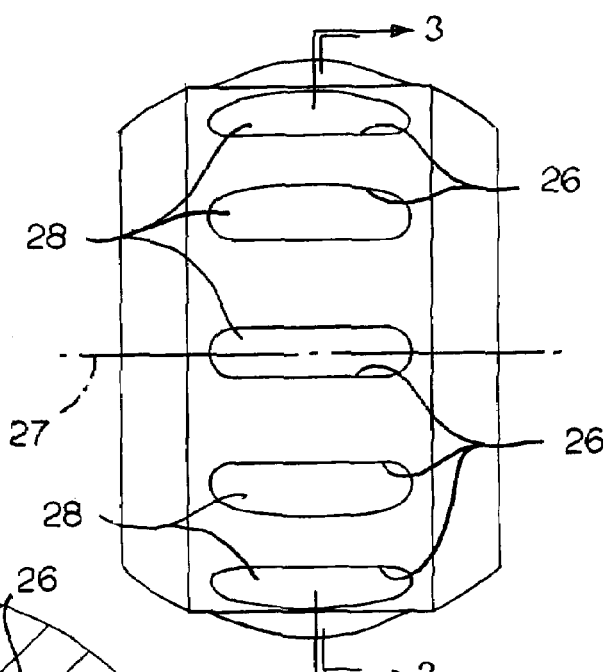
FIG. 2 is a side view of the bearing of FIG. 1, but with the holding sleeve removed.

Referring to FIGS. 2 and 4, the liner has a plurality of openings or slots 26. Each slot 26 is elongated and parallel to the axis 27 of rotation of a shaft. Other shapes and locations are possible.

Figure 3:
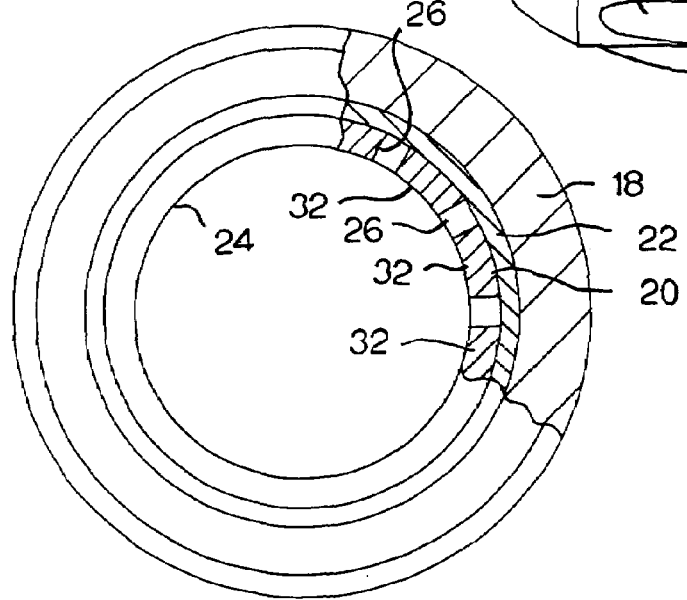
FIG. 3 is a sectional view as substantially seen along lines 3-3 of FIG. 2.

A ceramic bearing element 28 is disposed in each slot 26. Each ceramic bearing element could be straight or have a somewhat tapered configuration with an inner surface 32 curved to form a continuation of the cylindrical liner surface 24, as shown in FIG. 3.

Figure 6:
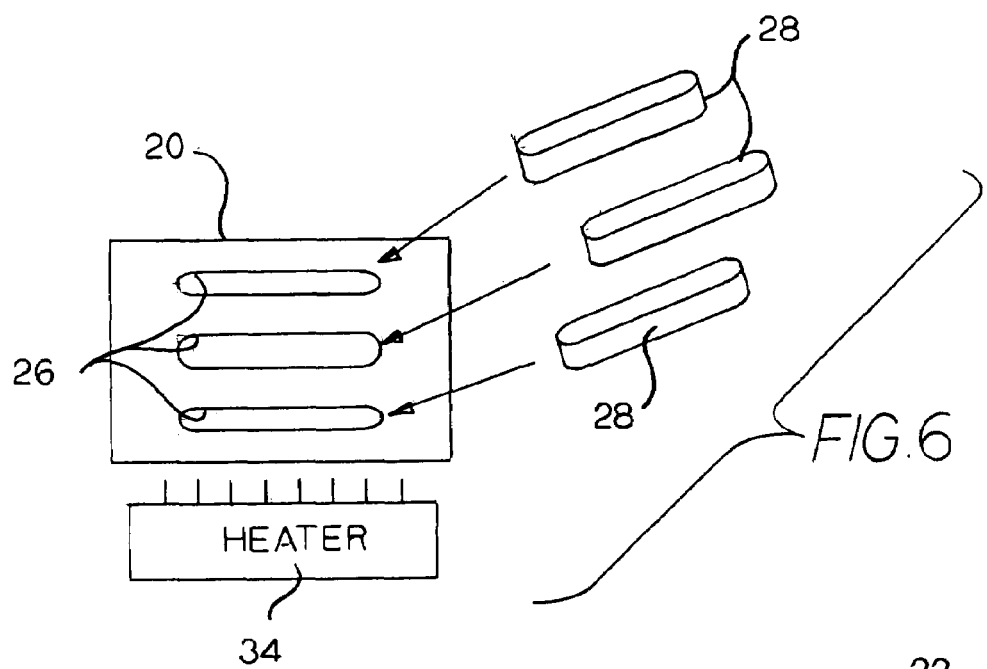
FIG. 6 is a cylindrical view illustrating steps in the process for making a preferred bearing.

At room temperature, the width of each slot 26 is slightly smaller (0.0002" to 0.001") than the width of its respective ceramic bearing element. Referring to FIG. 6, a heater 34 is then used to heat liner 20 to a temperature of about 1000° F., to enlarge the individual slots sufficiently to receive their respective ceramic bearing elements. When the liner is cooled to room temperature, the slots shrink to tightly retain their respective ceramic bearing elements in position, so they can be mechanical (ground) together as an assembly, both the outside diameter and the inside diameter.

Figure 7:
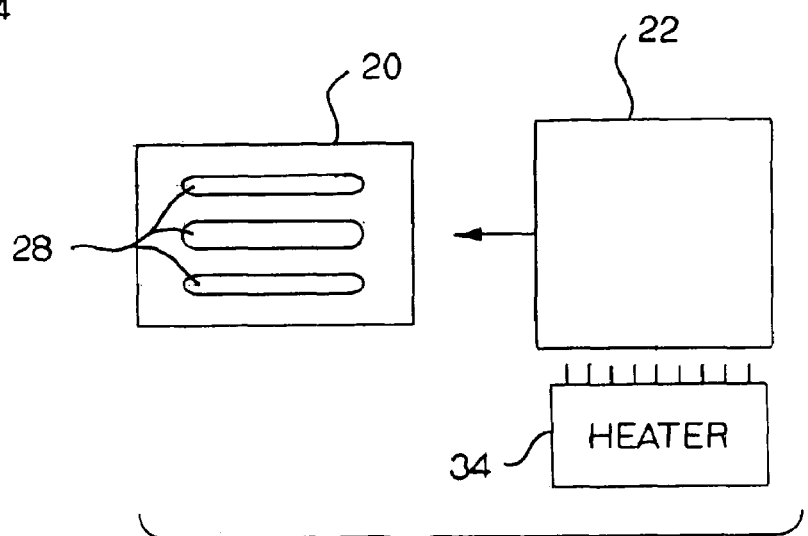
FIG. 7 illustrates further steps in making a preferred bearing.

The next step in making the preferred bearing is illustrated in FIG. 7, in which holding sleeve 22, formed of an alloy steel, is heated to enlarge its inner surface sufficiently to receive liner 20. The holding sleeve is then cooled, to tightly retain the ceramic bearing elements in position and to prevent them from moving outwardly away from the shaft when operating at a high temperature in the metal bath.

Figure 8:
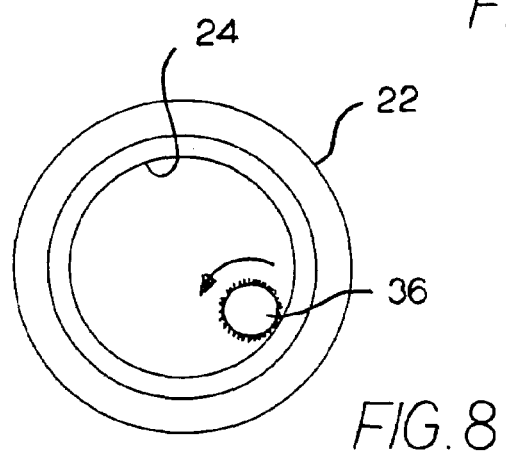
FIG. 8 is a view illustrating the manner in which the bearing surface of the liner is finished.
Figure 9:
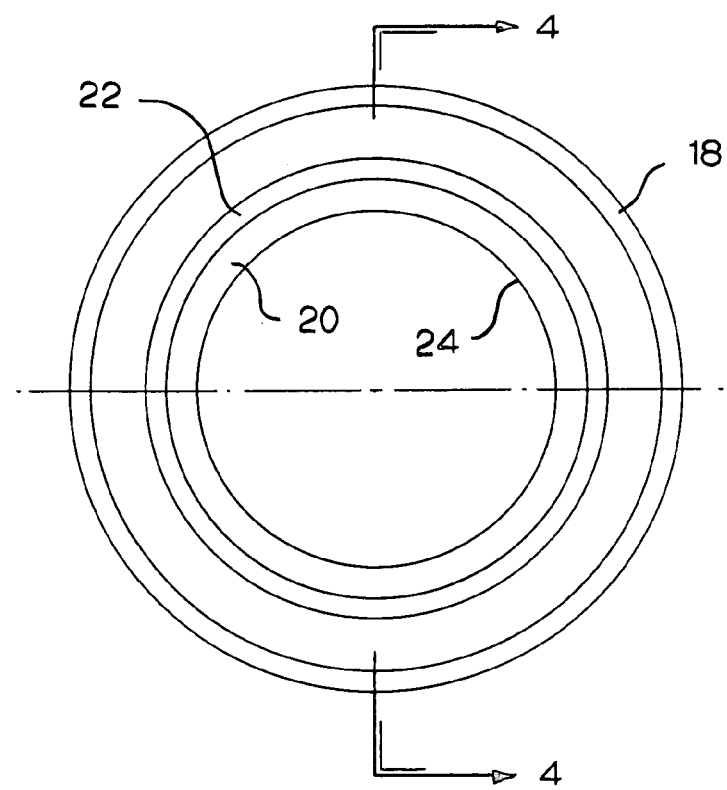
FIG. 9 is an end view of a preferred bearing.

Referring to FIG. 8, a finishing tool 36 is then employed to grind the entire inner bearing surface including both the liner and the ceramic bearing elements, to a smooth cylindrical surface with a diameter slightly larger than the intended shaft diameter.

Figure 10:
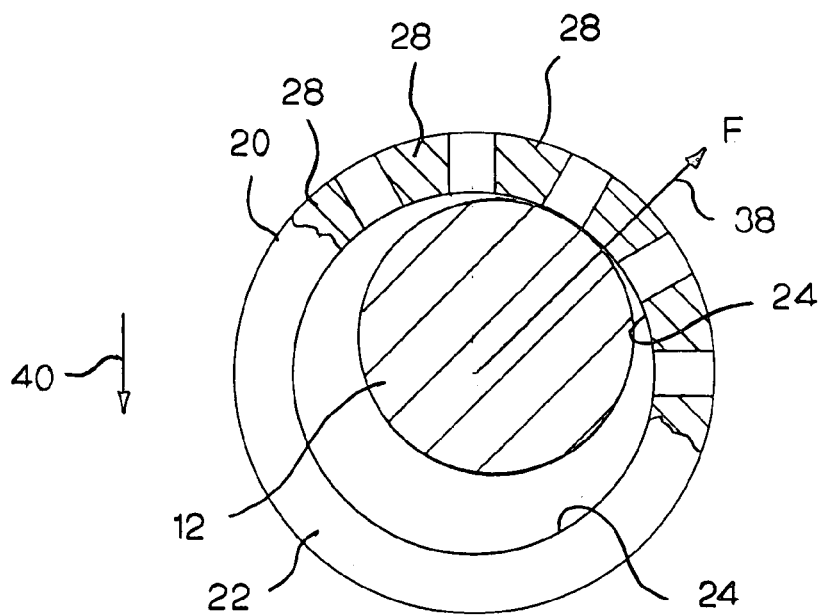
FIG. 10 is a view illustrating the load placed on a typical bearing illustrating the invention.

FIG. 10 illustrates the manner in which the shaft is supported within the liner. The load is applied in the direction of arrow 38. For that reason, over a period of time a portion of the liner bearing surface 24 will become worn. The bearing liner can be rotated in housing 18 in the direction of arrow 40, 90°, for example, to engage the shaft with an unworn portion of the liner. This reduces downtime in replacing such a bearing because the liner can be rotated to a new position rather than being replaced. The ceramic inserts reduce friction; act as metal dross wipers; and allow very close bearing shaft running clearances (0.010/0.015) vs. (0.250/0.300) on standard bearings.

Referring to FIG. 4, liner 20 has a partially spherical convex bearing surface 42 which slidably engages a partially spherical concave bearing surface 44 of holding sleeve 22. A pair of rings 46 and 48, attached to the housing and the holding sleeve, retain the holding sleeve in position.

Figure 5:
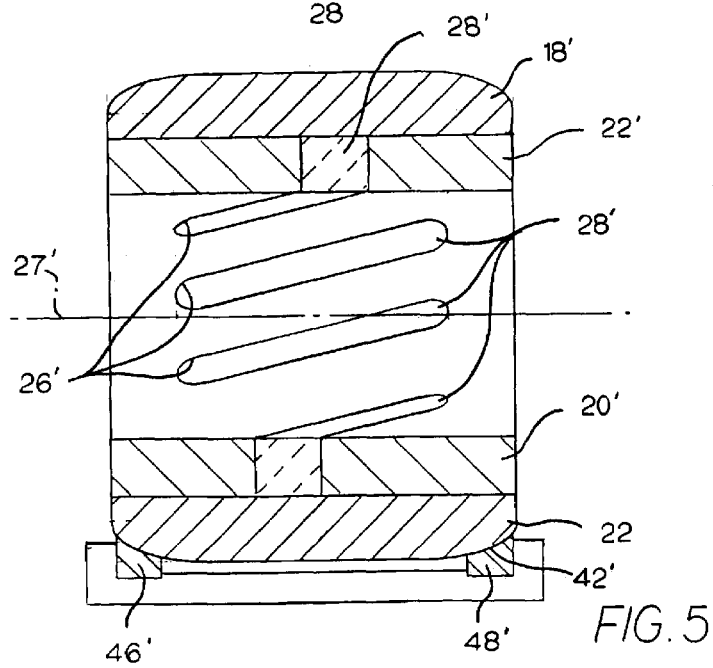
FIG. 5 is a view of an alternative slot configuration.

FIG. 5 illustrates an alternative embodiment of the invention in which those components similar to the components of FIG. 4 are designated by a prime.

In this case, slots 26' are parallel to one another, but inclined with respect to axis 27'.

Having described my invention, I claim:

1. A composite bearing useful for supporting a rotating load submerged in molten metal, comprising:
   a plurality of ceramic bearing elements each having a shaft-engaging surface;
   a metal liner having a plurality of circumferentially spaced ceramic element receiving slots, the ceramic bearing elements each being received in a respective slot, the liner being thermally expansive such that each slot has a diameter less than the diameter of its respective ceramic element at a lower liner temperature, and a diameter greater than the diameter of its respective ceramic element at a higher liner temperature, whereby each ceramic element is received into its respective slot at the higher liner temperature, and then is tightly held in the slot when the liner temperature is reduced to said lower liner temperature forming a cylindrical liner surface for slidably supporting a rotating shaft.

2. A composite bearing as defined in claim 1, in which the metal liner comprises a metal alloy having a low solubility with the particular molten metal in which the composite bearing structure is submerged.

3. A composite bearing as defined in claim 2, in which the metal alloy has a high hardness Rc>25, at the molten metal operating temperature.

4. A composite bearing as defined in claim 1, including a holding sleeve mounted on the liner to prevent the ceramic bearing elements from moving in their respective slots away from said cylindrical liner surface.

5. A composite bearing as defined in claim 1, in which the liner has a plurality of ceramic element-receiving slots extending through the liner, each of the ceramic bearing elements being receivable into its respective ceramic element-receiving slot by a motion toward the cylindrical liner surface, and including a holding sleeve telescopically disposed over the ceramic element-receiving slots to prevent a radial outward motion of the ceramic bearing elements.

6. A composite bearing as defined in claim 5, including self-aligning structure, comprising:
   an outer sleeve telescopically receiving the liner, the holding sleeve and the ceramic elements;
   self-aligning bearing structure disposed between the holding sleeve and the liner such that the liner is slidably swingable with respect to the holding sleeve.

7. A composite bearing as defined in claim 6, in which the self-aligning bearing structure comprises the liner having an outer partially-spherical bearing surface; and
   the holding sleeve having an inner partially spherical-bearing surface slidably engaging the outer partially-spherical bearing surface to permit a shaft disposed in the liner to move with respect to the holding sleeve.

8. A composite bearing as defined in claim 7, in which the self-aligning bearing structure includes a pair of spaced bearing rings connecting the holding sleeve in a fixed position with respect to the outer sleeve.

9. A composite bearing as defined in claim 7, in which the ceramic bearing elements are each elongated and supported parallel to the axis of rotation of a shaft supported by said ceramic bearing elements.

10. A composite bearing as defined in claim 1, including structure for supporting the liner in a shaft-supporting position but permitting the liner to be rotated about a longitudinal axis of the liner to a second shaft-supporting position.

11. A method for making a composite bearing having a plurality of ceramic bearing elements comprising the steps of, but not necessarily in this order:
   a) forming a liner having a cylindrical bearing surface having a plurality of circumferentially spaced ceramic-receiving openings;
   b) forming a plurality of ceramic bearing elements each receivable in a respective one of the ceramic-receiving openings; and larger than their respective ceramic-receiving openings;
   c) heating the liner to a temperature such that each ceramic-receiving opening enlarges to a size for receiving its respective ceramic bearing element;
   d) inserting each ceramic bearing element into its respective ceramic-receiving opening to a position in which each ceramic bearing element has a shaft-engaging surface forming a part of the liner cylindrical bearing surface; and e) telescopically inserting the liner and the ceramic bearing elements into a holding sleeve to prevent each ceramic bearing element from moving radially outwardly from its respective opening.

12. A method for making a composite bearing as defined in claim 11 including the step of surface finishing the cylindrical bearing surface of the liner after each ceramic bearing element has been mounted in its respective opening.

13. A method as defined in claim 12, including the step of surface finishing the cylindrical bearing surface of the liner to form a finished bearing surface.

14. A composite bearing useful for supporting a rotating load submerged in molten metal, comprising:
 a plurality of ceramic bearing elements each having a shaft-engaging surface;
 a metal liner having a plurality of circumferentially spaced ceramic element-receiving openings, the ceramic bearing elements each being received in a respective element-receiving opening to form a cylindrical liner surface for slidably supporting a rotating shaft;
 the ceramic element-receiving openings extending through the liner, each of the ceramic elements being receivable into its respective ceramic element-receiving opening by a motion toward the liner bearing surface, and including a holding sleeve telescopically disposed over the ceramic element-receiving openings to prevent a radial outward motion of the ceramic bearing elements; and
 self-aligning structure, comprising an outer sleeve telescopically receiving the liner, the holding sleeve and the ceramic bearing elements, and self-aligning bearing structure disposed between the holding sleeve and the liner such that the liner is slidably swingable with respect to the holding sleeve.

15. A composite bearing as defined in claim 14, in which the self-aligning bearing structure comprises the liner having an outer partially-spherical bearing surface; and the holding sleeve having an inner partially spherical bearing surface slidably engaging the outer partially-spherical bearing surface to permit a shaft disposed in the liner to move with respect to the holding sleeve.

16. A composite bearing as defined in claim 15, in which the self-aligning bearing structure includes a pair of spaced bearing rings, connecting the holding sleeve in a fixed position with respect to the outer sleeve.

17. A composite bearing as defined in claim 15, in which the ceramic bearing elements are each elongated and supported parallel to the axis of rotation of a shaft supported by the cylindrical liner surface.

18. A composite bearing useful for supporting a rotating load submerged in molten metal, comprising:
 a plurality of ceramic bearing elements each having a shaft-engaging surface; and
 a metal liner having a plurality of circumferentially-spaced ceramic element-receiving slots, the ceramic bearing elements each being receivable in a respective slot, the liner being thermally expansive such that each slot is smaller than its respective ceramic bearing element at a lower liner temperature, and is larger than its respective ceramic bearing element at a higher liner temperature, whereby each ceramic bearing element is receivable into its respective slot at the higher liner temperature, and then is tightly held in the slot when the liner temperature is reduced to said lower liner temperature forming a cylindrical liner surface for slidably supporting a rotating shaft.

19. A composite bearing as defined in claim 18, including a holding sleeve having a thermal expansion characteristic that is the same as the thermal expansion characteristic of the liner, the holding sleeve being mounted on the liner to prevent the ceramic bearing elements from moving in their respective slots as the temperature of the liner and the holding sleeve is changed.

* * * * *